United States Patent
Hood

(10) Patent No.: US 8,320,403 B2
(45) Date of Patent: Nov. 27, 2012

(54) MULTIPLEXED SENSOR ARRAY

(75) Inventor: Sheldon James Hood, Richmond (CA)

(73) Assignee: Excelitas Canada, Inc., Vaudreuil (CA)

( * ) Notice: Subject to any disclaimer, the term of this patent is extended or adjusted under 35 U.S.C. 154(b) by 339 days.

(21) Appl. No.: 12/826,449

(22) Filed: Jun. 29, 2010

(65) Prior Publication Data
US 2011/0317715 A1 Dec. 29, 2011

(51) Int. Cl.
 *H04J 3/16* (2006.01)
(52) U.S. Cl. ............... 370/465; 340/870.01; 702/108
(58) Field of Classification Search ............... 370/465, 370/201–211, 338, 334; 340/870.01–870.19; 702/108, 127
See application file for complete search history.

(56) References Cited

U.S. PATENT DOCUMENTS

| | | | |
|---|---|---|---|
| 5,333,088 A | 7/1994 | Sweet | |
| 5,717,458 A | 2/1998 | Yonemoto | |
| 5,847,862 A | 12/1998 | Chraplyvy et al. | |
| 6,067,113 A | 5/2000 | Hurwitz et al. | |
| 6,078,356 A | 6/2000 | Jensen | |
| 6,310,571 B1 * | 10/2001 | Yang et al. | 341/155 |
| 6,714,742 B1 | 3/2004 | Hayee et al. | |
| 2005/0062460 A1 | 3/2005 | Blake et al. | |
| 2005/0258821 A1 | 11/2005 | Wang et al. | |
| 2006/0034569 A1 * | 2/2006 | Shih et al. | 385/39 |
| 2007/0113681 A1 * | 5/2007 | Nishimura et al. | 73/862.046 |
| 2007/0152747 A1 | 7/2007 | Smith et al. | |
| 2007/0194629 A1 | 8/2007 | Itoh et al. | |
| 2011/0216626 A1 * | 9/2011 | Stacey et al. | 367/131 |

FOREIGN PATENT DOCUMENTS

CA  2318305 A1  7/1999

OTHER PUBLICATIONS

Kolling et al., (1989) Two-lead multiplex system for sensor array applicaitons, Sensors and Actuators, 17 (3-4). pp. 623-628 ISSN 0250-6874.*
International Search Report and Written Opinion received in PCT Patent Application No. PCT/CA2011/000589, mailed on Sep. 15, 2011, 7 pages.
Hanson, Uncooled Thermal Imaging Detectors and Systems, SPIE (2010) pp. 1-187.
Kruse, Uncooled Thermal Imaging: Arrays, Systems, and Applications, SPIE Press (2002) pp. 1-89.

* cited by examiner

*Primary Examiner* — Gary Mui
(74) *Attorney, Agent, or Firm* — Peter A. Nieves; Sheehan Phinney Bass + Green PA

(57) ABSTRACT

A sensor array, comprising: a plurality of sensors electrically connected in series or in parallel, each of the plurality of sensors operable to generate an individual electrical signal; a multiplexing scheme generator operable to generate a multiplexing scheme; a modulation system connected to the multiplexing scheme generator and operable to selectively reverse the polarity of each of the plurality of sensors for each of a plurality of samples; a readout device operable to sequentially read a plurality of output signals of the plurality of electrically connected sensors, wherein the number of samples is greater than or equal to the number of sensors and wherein one or more electrical signals of the plurality of sensors are readout as one electrical signal; and a demultiplexer operable to receive the output electrical signals and to determine the individual electrical signals of each of the plurality of sensors based on the multiplexing scheme.

18 Claims, 10 Drawing Sheets

540 →

541 ↓

| Sensor | Modulation --> | | | | | | | | ← 542 |
|---|---|---|---|---|---|---|---|---|---|
| | 1 | 2 | 3 | 4 | 5 | 6 | 7 | 8 | |
| 1 | 1 | 1 | 1 | 1 | 1 | 1 | 1 | 1 | |
| 2 | 1 | -1 | 1 | -1 | 1 | -1 | 1 | -1 | |
| 3 | 1 | 1 | -1 | -1 | 1 | 1 | -1 | -1 | |
| 4 | 1 | -1 | -1 | 1 | 1 | -1 | -1 | 1 | ← 543 |
| 5 | 1 | 1 | 1 | 1 | -1 | -1 | -1 | -1 | |
| 6 | 1 | -1 | 1 | -1 | -1 | 1 | -1 | 1 | |
| - | 0 | 0 | 0 | 0 | 0 | 0 | 0 | 0 | |
| - | 0 | 0 | 0 | 0 | 0 | 0 | 0 | 0 | |

| | | Column Modulation 1 | | | | Column Modulation 2 | | | | Column Modulation 3 | | | | Column Modulation 4 | | | | |
|---|---|---|---|---|---|---|---|---|---|---|---|---|---|---|---|---|---|---|
| | Sensor | Modulation --> | | | | | | | | | | | | | | | | ← 552 |
| | | 1 | 2 | 3 | 4 | 5 | 6 | 7 | 8 | 9 | 10 | 11 | 12 | 13 | 14 | 15 | 16 | |
| Column 1 | 1 | 1 | 1 | 1 | 1 | 1 | 1 | 1 | 1 | -1 | -1 | -1 | -1 | -1 | -1 | -1 | -1 | |
| | 2 | 1 | -1 | 1 | -1 | 1 | -1 | 1 | -1 | -1 | 1 | -1 | 1 | -1 | 1 | -1 | 1 | |
| | 3 | 1 | 1 | -1 | -1 | 1 | 1 | -1 | -1 | -1 | -1 | 1 | 1 | -1 | -1 | 1 | 1 | |
| | 4 | 1 | -1 | -1 | 1 | 1 | -1 | -1 | 1 | -1 | 1 | 1 | -1 | -1 | 1 | 1 | -1 | |
| Column 2 | 5 | 1 | 1 | 1 | 1 | -1 | -1 | -1 | -1 | -1 | -1 | -1 | -1 | 1 | 1 | 1 | 1 | |
| | 6 | 1 | -1 | 1 | -1 | -1 | 1 | -1 | 1 | -1 | 1 | -1 | 1 | 1 | -1 | 1 | -1 | |
| | 7 | 1 | 1 | -1 | -1 | -1 | -1 | 1 | 1 | -1 | -1 | 1 | 1 | 1 | 1 | -1 | -1 | ← 553 |
| | 8 | 1 | -1 | -1 | 1 | -1 | 1 | 1 | -1 | -1 | 1 | 1 | -1 | 1 | -1 | -1 | 1 | |
| Column 3 | 9 | 1 | 1 | 1 | 1 | 1 | 1 | 1 | 1 | 1 | 1 | 1 | 1 | 1 | 1 | 1 | 1 | |
| | 10 | 1 | -1 | 1 | -1 | 1 | -1 | 1 | -1 | 1 | -1 | 1 | -1 | 1 | -1 | 1 | -1 | |
| | 11 | 1 | 1 | -1 | -1 | 1 | 1 | -1 | -1 | 1 | 1 | -1 | -1 | 1 | 1 | -1 | -1 | |
| | 12 | 1 | -1 | -1 | 1 | 1 | -1 | -1 | 1 | 1 | -1 | -1 | 1 | 1 | -1 | -1 | 1 | |
| Column 4 | 13 | 1 | 1 | 1 | 1 | -1 | -1 | -1 | -1 | 1 | 1 | 1 | 1 | -1 | -1 | -1 | -1 | |
| | 14 | 1 | -1 | 1 | -1 | -1 | 1 | -1 | 1 | 1 | -1 | 1 | -1 | -1 | 1 | -1 | 1 | |
| | 15 | 1 | 1 | -1 | -1 | -1 | -1 | 1 | 1 | 1 | 1 | -1 | -1 | -1 | -1 | 1 | 1 | |
| | 16 | 1 | -1 | -1 | 1 | -1 | 1 | 1 | -1 | 1 | -1 | -1 | 1 | -1 | 1 | 1 | -1 | |

FIGURE 5F

MULTIPLEXED SENSOR ARRAY

BACKGROUND

1. Field

The present application relates generally to sensor arrays, and more particularly to a method and system for determining the electrical signals of individual sensors in large sensor arrays.

2. Related Art

Electrical sensors are widely used for converting a sample space's physical characteristics, such as temperature or electromagnetic radiation, into an electrical signal. Where multiple measurements of a sample space are required, multiple sensors are employed in a sensor array. Measuring the signal of individual sensors is impractical, however, because routing attendant hardware, such as conduit or electrical connection, to each sensor reduces the array's spatial density. Accordingly, to achieve a reduction in the number of conduits or connections within the array area, measuring the sensors' outputs is typically achieved by multiplexing the electrical signals of the individual sensors and then demultiplexing the multiplexed signal to determine the individual sensors' signals.

Time-division multiplexing ("TDM") is a typical multiplexing method. In TDM, a sample period, or "frame," is divided into timeslots, each timeslot allocated to a single sensor's electrical signal. For a sensor array with N sensors, the frame is divided into N timeslots and the electrical signal for the first sensor is transmitted in the first timeslot, the electrical signal for the second sensor is transmitted in the second timeslot, and so on. However, the amount of time in TDM for averaging the generally weak electrical signal for each sensor falls as the number of sensors in the array grows. Consequently, the apparent detection noise level grows as the number of sensors in the array grows when using TDM because the noise bandwidth grows. As a result, TDM is impractical for large sensor arrays employing sensors with relatively weak or noisy electrical signals because the correlation between the averaging time of the noise level and the array size effectively limits the number of sensors.

To achieve high resolution and/or accommodate large sample spaces for sensors with weak electrical signals, a sensor array and multiplexing technique is needed where the output noise level does not grow as the array size grows.

In the present application, improved multiplexed sensor arrays are disclosed. In addition, an improved method for determining the electrical signal of individual sensors in sensor arrays is disclosed. This multiplexing technique allows for sensor readout wherein the output noise level does not substantially grow as the array size grows.

SUMMARY

In accordance with one aspect of the present application, a frequency multiplexed sensor array is disclosed, wherein the sensor array includes a plurality of electrically connected sensors, a multiplexing scheme generator operable to generate a multiplexing scheme or pattern, a modulation system connected to the multiplexing scheme generator and operable to selectively reverse the polarity of each of the plurality of sensors for each of a plurality of samples based on the multiplexing scheme or pattern, a readout device operable to sequentially read a plurality of output signals of the plurality of electrically connected sensors, and a demultiplexer operable to determine the individual electrical signals of each of the plurality of sensors.

In accordance with another aspect of the present application, a method is disclosed for determining the individual electrical signal of each of a plurality of electrically connected sensors in a sensor array. The method includes generating a multiplexing scheme or pattern, multiplexing the plurality of sensors by selectively reversing the polarity of each sensor based on the multiplexing scheme or pattern, measuring a plurality of samples of the plurality of multiplexed sensors, and demultiplexing the plurality of samples.

BRIEF DESCRIPTION OF THE FIGURES

The present application can be best understood by reference to the following description taken in conjunction with the accompanying drawing figures, in which like parts may be referred to by like numerals.

FIGS. 5A, 5B, 5C, 5D, 5E, and 5F illustrate exemplary multiplexing schemes for sensor arrays comprising 4, 4, 8, 16, 6, and 16 sensors, respectively, in accordance with the present application.

DETAILED DESCRIPTION

The following description sets forth numerous specific configurations, parameters, and the like. It should be recognized, however, that such description is not intended as a limitation on the scope of the present application, but is instead provided as a description of exemplary embodiments.

In accordance with the present application, a sensor array is multiplexed by selectively reversing the polarity of each sensor in the array and multiple electrical measurements or "samples" of the combined sensors' electrical signal are taken. A multiplexing scheme varies each sensor's polarity so that the set of samples can be demultiplexed to yield each sensor's electrical signal. The samples are distributed over the frame, limiting the total noise level by controlling the bandwidth to the order of the frame rate. In this way, the noise level of the sensor array of the present application may be independent of the array size, allowing for larger sensor arrays with better dynamic range.

Figure 1:
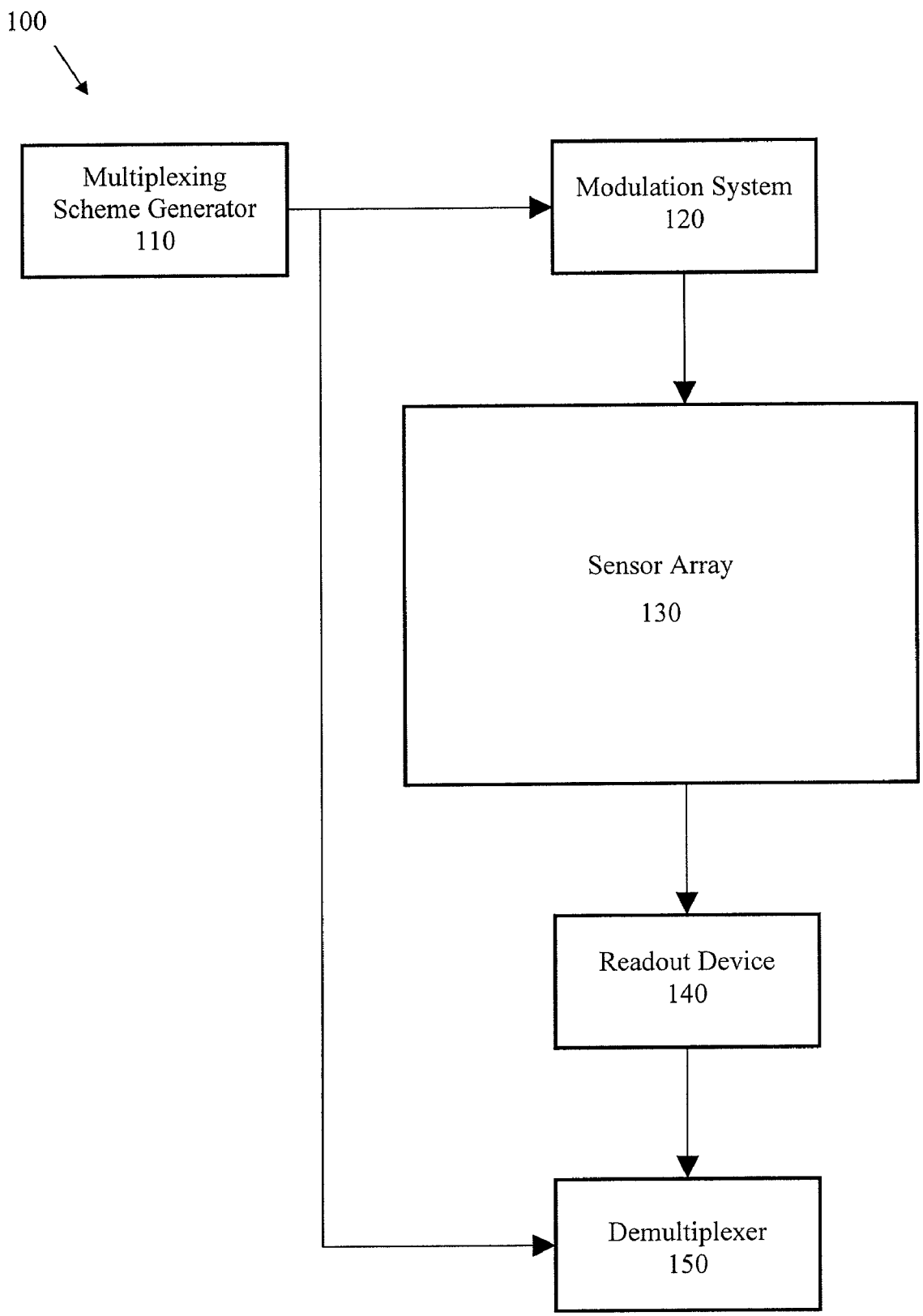
FIG. 1 illustrates a block diagram of a frequency multiplexed sensor array 100 in accordance with the present application.

FIG. 1 illustrates a block diagram of a frequency multiplexed sensor array 100 in accordance with the present application. The frequency multiplexed sensor array 100 comprises a multiplexing scheme generator 110, a modulation system 120, a sensor array 130, a readout device 140, and a demultiplexer 150.

The sensor array 130 includes a plurality of sensors, each operable to convert an incident physical property into an electrical signal. Exemplary sensors include thermopiles and bolometers which measure (typically infrared) electromagnetic radiation, although any sensor could be used. The plurality of sensors may be physically arranged in columns and rows, but may also consist of a single row or a single column. The plurality of sensors may be electrically connected in series or in parallel, or a combination of in series and in parallel. Although any number of sensors may be connected in series, practical considerations may limit the number. For example, each sensor element contributes a finite series equivalent resistance, which generates a finite "Johnson" noise voltage, superimposed on the sensor output signal, so the overall noise on the array grows as the number of sensors in the series grows. The overall resistance of the electrical sensors can grow so large as to adversely affect the electrical performance of the sensor array. Also, leakage currents generated by the switches implementing the modulation system 120 can accumulate as the number of sensors in the series grows. In some embodiments, the number of sensors connected in series is limited by considering the total resistance and/or the accumulated leakage currents. The modulation method described herein is designed to minimize the effects of this noise by allowing maximum noise averaging of each sensor signal within the finite array readout time.

The modulation system 120 includes a means to selectively reverse the polarity of the electrical signal generated by each of the individual sensors of the sensor array 130. An exemplary modulation system includes modulation clocks coupled to two pairs of input and output switches connected to the electrical signal side of the respective sensor. This modulation system reverses the polarity of the given sensor by changing the combination of open and closed switches. An exemplary modulation system is described in more detail below with reference to FIG. 2. In a further embodiment, the modulation system comprises one modulation clock for all the sensors in one row, one modulation clock for all the sensors in one column, and an XOR gate at each sensor to selectively operate polarity-reversing switch arrangements (illustrated as exemplary paired switches such as 320 & 331 and 330 & 321 in FIG. 3) to reverse the polarity of the electrical signal generated at that sensor. XOR gates are well known in the art and can be understood herein to refer to an electronic logic gate that implements exclusive disjunction. An exemplary modulation system is described in more detail below with reference to FIG. 3.

Referring to FIG. 1, the readout device 140 samples the electrical signal from the sensor array 130. In an exemplary embodiment, the readout device 140 is operable to measure the voltage of the sensor array 130. In some embodiments, the readout device is operable to simultaneously measure the properties of electrical signals from groups of combined sensors within the sensor array 130. In other embodiments, the readout device 140 measures the combined electrical signal of all the sensors in the sensor array 130, such as, for example, the voltage of the sensors when the sensors are electrically arranged in series or the current of the sensors when the sensors are electrically arranged in parallel.

The multiplexing scheme generator 110, through the modulation system 120, governs which sensors of the sensor array 110 are subject to polarity reversal at any given time. As used herein, a multiplexing scheme may be understood to be synonymous with a multiplexing pattern. An exemplary multiplexing scheme includes time-variation of the polarity of each of the plurality of sensors so that the samples taken by the readout device 140 can be subsequently demultiplexed to yield each individual sensor's electrical signal. This requires that the number of samples taken is greater than or equal to the number of sensors in the sensor array 130. In some embodiments, the number of samples may exceed the number of sensors in the array. The multiplexing scheme may be manually selected and inputted into the multiplexing scheme generator 110 or may be calculated by a computer and communicated to the multiplexing scheme generator 110. Exemplary multiplexing schemes are described in more detail below with reference to FIG. 4A-4H and 5A-5F.

Referring to FIG. 1, the demultiplexer 150 receives the multiplexing scheme from the multiplexing scheme generator 110 and the properties of the combined electrical signal from the readout device 140. The demultiplexer 150 applies an algorithm to the samples and multiplexing scheme to determine the electrical signals of each of the individual sensors. In a preferred embodiment, a computationally efficient algorithm, such as a Fast Fourier Transform or a "divide-and-conquer" algorithm, is employed. However, one of skill in the art will readily appreciate that any algorithm capable of solving a set of linear equations can be employed. An exemplary demultiplexing algorithm is described in more detail with respect to FIG. 6. In some embodiments, the demultiplexer 150 is connected, for example, to a user interface (not shown) or a computer readable medium (not shown).

The frequency multiplexed sensor array 100 results in an improvement of dynamic range when the sensors are electrically connected in series. As more sensors are connected in series, total resistance increases linearly and so the thermal noise associated with this total resistance increases with the square root of the resistance. For N sensors electrically connected in series, the dynamic range increases by $V_{signal}/V_{noise}$, which is proportional to $N/\sqrt{N}$, i.e. $\sqrt{N}$, and so as the number of sensors in the series increases, the dynamic range increases by $\sqrt{N}$. Accordingly, as more sensors are added to the sensor array, an increase in the dynamic range is realized.

Figure 2:
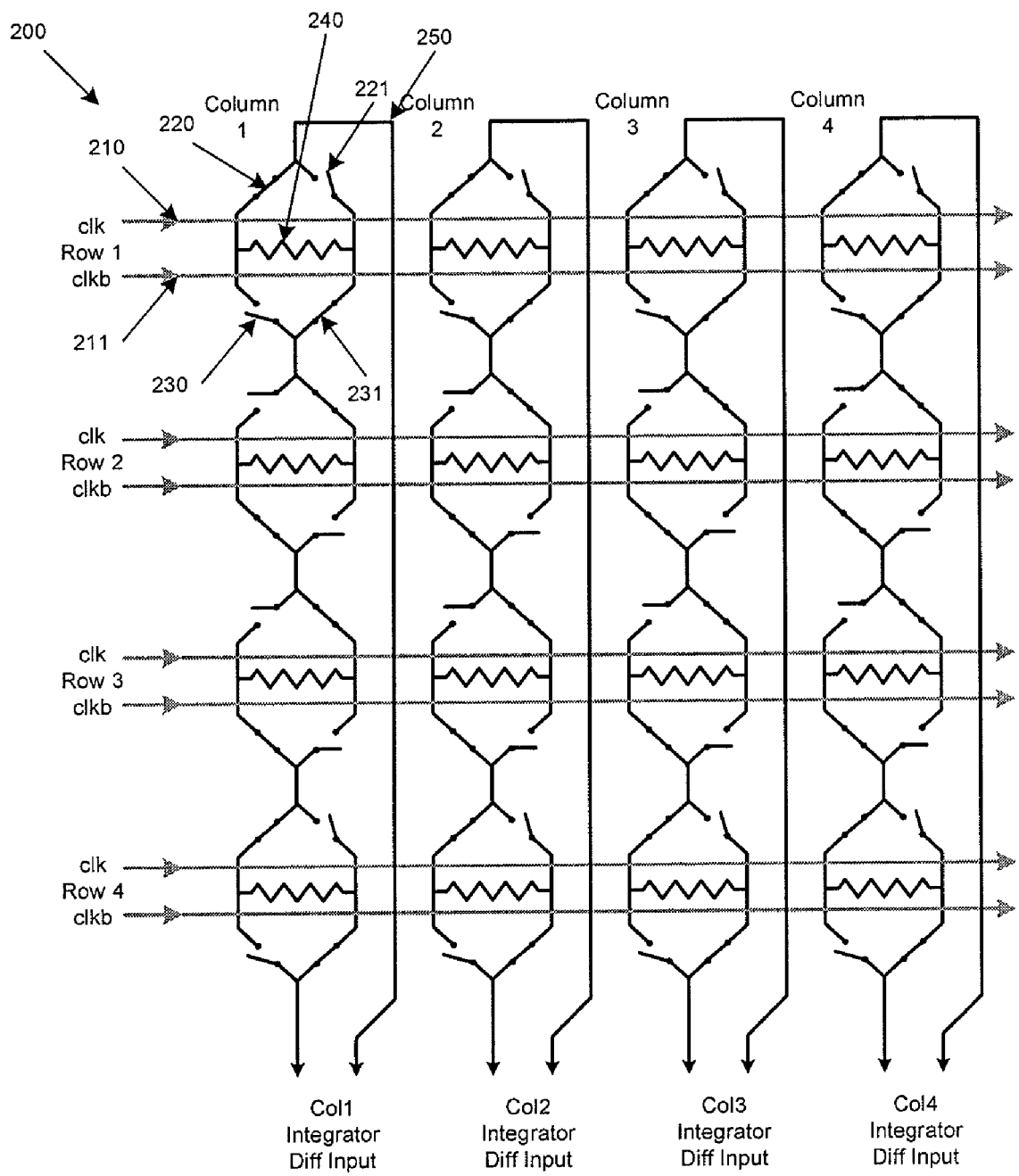
FIG. 2 illustrates a modulation system 200 in accordance with the present application.

FIG. 2 illustrates a modulation system 200 in accordance with the present application. Modulation system 200 may correspond to modulation system 120, described above with respect to FIG. 1. The modulation system 200 comprises communication lines 210 and 211 connected to a multiplexing system generator (not shown), input switches 220 and 221, and output switches 230 and 231. The plurality of sensors 240 and electrical circuits 250 may correspond to sensor array 130, described above with respect to FIG. 1.

The input and output switches are paired so that the electrical signal generated by a sensor 240 can be selectively reversed. For example, input switch 220 is paired with output switch 231 and input switch 221 is paired with output switch 230. When one pair of switches is closed, the other pair is open, allowing the electrical signal generated by sensor 240 to flow through electric circuit 250, which must include the closed switches and exclude the open switches. When the open-closed switch configuration is reversed, the electrical signal current flows in the opposite direction through electric circuit 250. In this way, the polarity of the electrical signal of a sensor 240 can be reversed by altering the arrangement of open-closed switch pairs.

The embodiment of FIG. 2 may be impractical for applications that require large-area arrays where the pixel/sensor size must be small. If the number of sensors connected in series exceeds the number of sensors in one row or column, then multiple modulation clocks must be routed through each pixel, thereby increasing each sensor's size and reducing resolution. To resolve this problem, an XOR gate may be added at each sensor. This exemplary embodiment of the present application, described in more detail below with respect to FIG. 3, requires only one row and one column modulation clock to generate the modulation for each pixel/sensor. Since the row and column modulation clocks can be single ended, the number of modulation clocks routed through each pixel is no greater than if the pixels/sensors were connected column-wise or row-wise.

Figure 3:
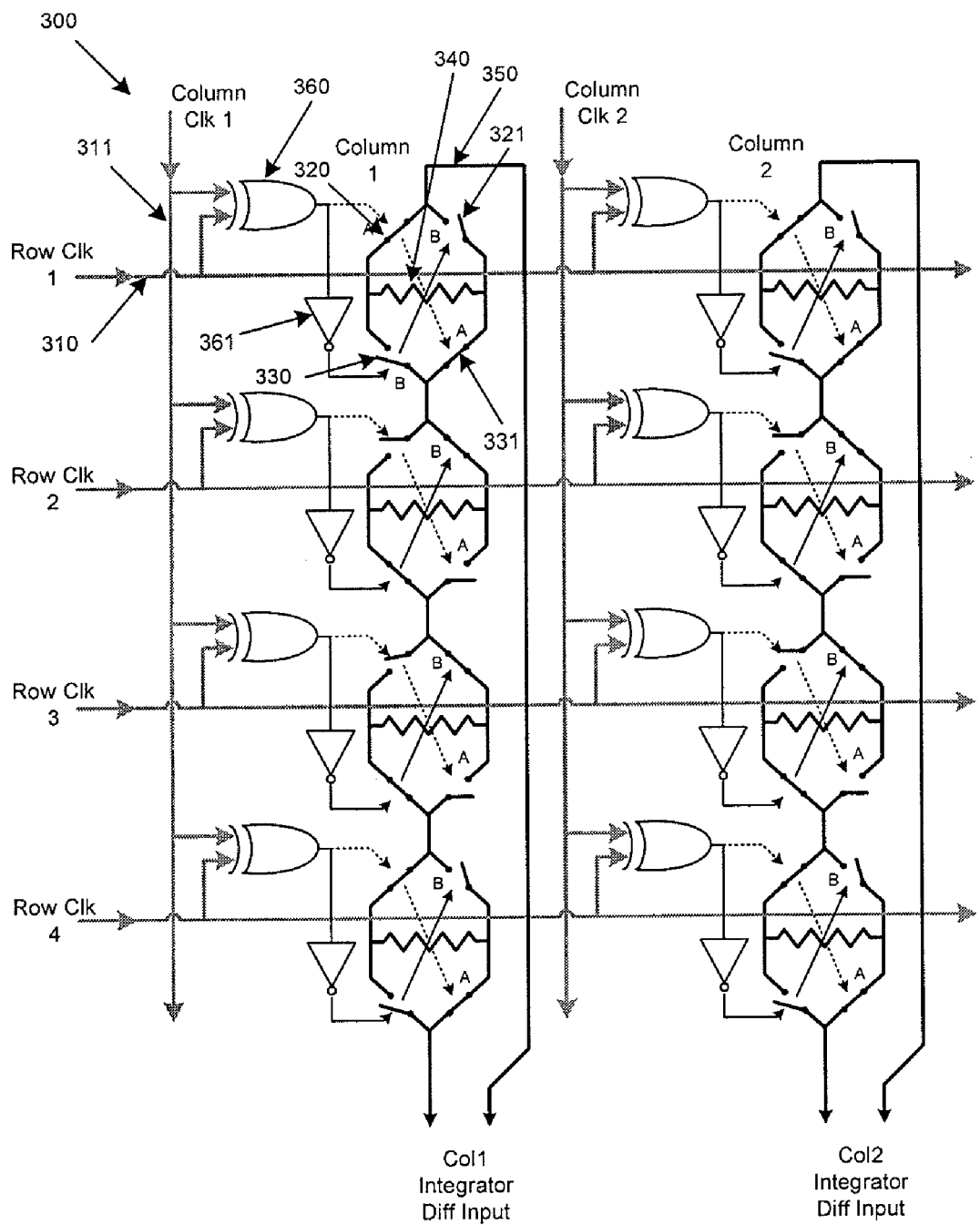
FIG. 3 illustrates a modulation system 300 in accordance with the present application.

FIG. 3 illustrates a modulation system 300 in accordance with the present application. Modulation system 300 may correspond to modulation system 120, described above with respect to FIG. 1. The modulation system 300 comprises row communication lines 310 and column communication lines 311 connected to a multiplexing system generator (not shown), input switches 320 and 321, output switches 330 and 331, XOR Gates 360, and NOT Gates 361. The plurality of sensors 340 and electrical circuits 350 may correspond to sensor array 130, described above with respect to FIG. 1.

As with modulation system 200, the input and output switches of modulation system 300 are paired so that the polarity of the electrical signal generated by a sensor 340 can be selectively reversed. In modulation system 300, however, XOR Gates 360 and NOT Gates 361 at each sensor 340 eliminate the need for each sensor to be individually connected to the multiplexing system generator. Row and column communication lines 310 and 311 respectively control the sensor switches. If the row communication line 310 and column communication line 311 are the same, the output of XOR Gate 360 is true, closing input switch 320 and paired output switch 331. Because the output of XOR Gate 360 is true, the input of NOT Gate 361 is true and so the output of NOT Gate 361 is false, opening input switch 321 and paired output switch 330. Conversely, if the row communication line 310 and column communication line 311 are opposite, then input switch 320 and paired output switch 331 are open and input switch 321 and paired output switch 330 are closed. In this way, the polarity of the electrical signal of a sensor 340 can be reversed by altering the signal of the row communication line 310 and the signal of the column communication line 311.

The exemplary embodiment of FIG. 3 provides improved spatial efficiency for the modulation systems of larger sensor arrays. Modulation system 200, described above with respect to FIG. 2, requires that each sensor 240 be individually connected to the multiplexing system generator. Accordingly, multiple connection lines must be routed to the sensors in each row (or column), which requires a substantial amount of space for large sensor arrays, thereby decreasing the sensor array's spatial density. To illustrate the advantages of this embodiment, consider a sensor array with 8 columns where all sensors in each column are connected in one electrical circuit. Each sensor in each row requires its own modulation clock and the inverse of that modulation clock. Thus, each row requires 16 connection lines. For connection lines of 3 μm width and 3 μm space, the sensor array of FIG. 2 requires 16×6=96 μm for connection lines routed through each row of the sensor array. The sensor array of FIG. 3, however, requires only 6 μm of connection lines per row.

Figures 4A, 4B, 4C, 4D:
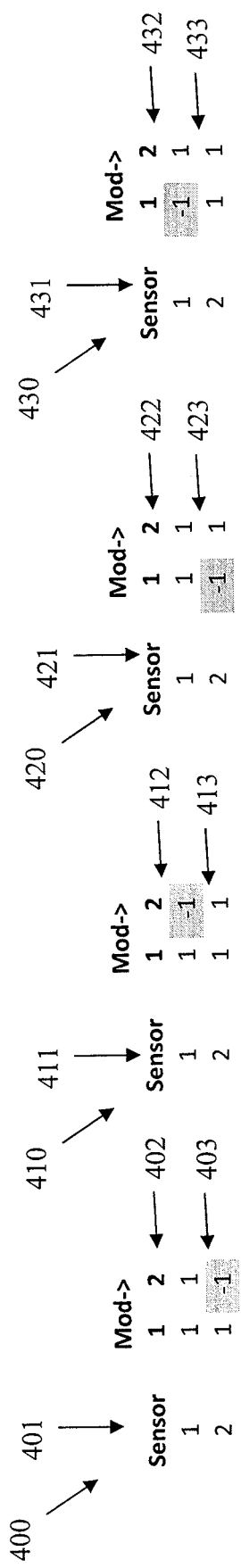
FIGS. 4A-4H illustrate exemplary multiplexing schemes for sensor arrays comprising 2 sensors and 2 modulations in accordance with the present application.
Figures 4E, 4F, 4G, 4H:
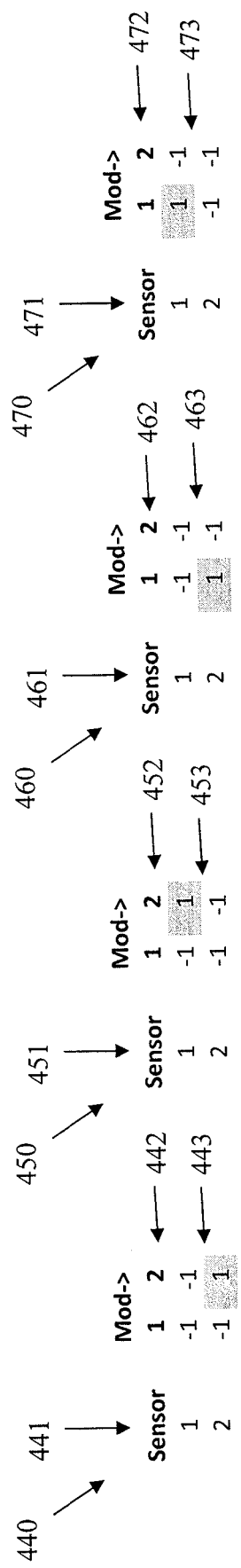

FIGS. 4A-4H illustrate exemplary multiplexing schemes for sensor arrays comprising 2 sensors and 2 modulations. The first column (401, 411, 421, 431, 441, 451, 461, and 471) of each figure identifies the sensor numbers in the sensor array. The modulation numbers (402, 412, 422, 432, 442, 452, 462, and 472) are displayed horizontally at the top of the figure. The polarity matrix (403, 413, 423, 433, 443, 453, 463, and 473) represents the multiplexing scheme, wherein the sign of the numeral 1 at each position of the matrix represents the polarity of the associated sensor at that modulation. For example, only the polarity of sensor 2 in the second modulation of the multiplexing scheme illustrated in FIG. 4A is reversed, and, thus, only sensor 2 at modulation 2 is represented by "−1" in the multiplexing polarity matrix.

An exemplary embodiment of the present application will be described now with respect to FIG. 4A. For illustrative purposes, assume that FIG. 4A represents a multiplexing scheme for an array of two voltage-generating sensors electrically connected in series. Refer to the voltage generated by sensors one and two as x and y, respectively. For modulation one, neither polarity is reversed, so the combined voltage, i.e., the readout, of sensor one and two is x+y. For modulation two, the polarity of sensor two is reversed, so the combined voltage of sensor one and two is x−y. The voltage of each of the sensors can then be determined by either adding the combined voltage of modulation one and modulation two (sensor one), or subtracting the combined voltage of modulation two from the combined voltage of modulation one (sensor two), and dividing the result by two.

The multiplexing scheme described above, and an exemplary demultiplexing algorithm, can also be understood as a series of linear equations. Equations 1 and 2 represent the combined voltages at modulation 1 and 2, respectively.

$$x+y=\text{mod }1 \qquad \text{Eq 1}$$

$$x-y=\text{mod }2 \qquad \text{Eq 2}$$

As noted above, the voltage of each of the sensors can be determined by either adding the combined voltage of modulation one and modulation two (sensor one—equation 3), or subtracting the combined voltage of modulation two from the combined voltage of modulation one (sensor two—equation 4), and dividing the result by two.

$$\frac{\text{mod}1 + \text{mod}2}{2} = \frac{x+y+x-y}{2} = \frac{2x}{2} = x \qquad \text{Eq 3}$$

$$\frac{\text{mod}1 - \text{mod}2}{2} = \frac{x+y-(x-y)}{2} = \frac{2y}{2} = y \qquad \text{Eq 4}$$

A multiplexing scheme can be obtained by reversing the polarity of any sensor at any modulation and not reversing any other polarity, either of the same or a different sensor, as illustrated in FIGS. 4A-4D. A multiplexing scheme can also be obtained by reversing the polarity of both sensors' modulation, except for one sensor at one modulation, as illustrated in FIGS. 4E-4H. The key aspect of all these modulation schemes is that one, and only one, of the sensor polarities differ from all the other sensors' polarities for one, and only one, modulation. For illustrative purposes, the unique polarity in FIGS. 4A-4H is identified by the shaded position of the associated multiplex scheme matrix. These eight matrices are the only multiplexing schemes for a two-sensor array.

FIGS. 5A, 5B, 5C, and 5D illustrate exemplary multiplexing schemes for sensor arrays comprising 4, 4, 8, and 16 sensors, respectively, in accordance with the present application. Similar to FIGS. 4A-4H, the first column (501, 511, 521, and 531) identifies the sensor, the first row (502, 512, 522, and 532) identifies the modulation number, and the polarity matrix (503, 513, 523, and 533) represents the multiplexing scheme, wherein the sign of the numeral 1 at each position represents the polarity of the associated sensor at that modulation.

The trivial case of two sensors may be extrapolated to generate the multiplexing scheme of sensor arrays of $2^{n+1}$ sensors, where n is any positive integer, as illustrated in FIGS. 5A-5D. It should be first appreciated that every $2^{n+1} \times 2^{n+1}$ matrix can be written as a 2×2 matrix, where each position in that matrix corresponds to a $2^n \times 2^n$ matrix. The first matrix level can be understood herein to refer to the largest 2×2 matrix, corresponding to four quadrants of $2^n \times 2^n$ matrices, in a $2^{n+1} \times 2^{n+1}$ matrix. This 2×2 matrix can be solved to yield two $2^n \times 2^n$ matrices if the first level matrix takes the form of any of the matrices in FIGS. 4A-4H. Both of these $2^n \times 2^n$ matrices can be rewritten as a 2×2 matrix, where each position in that matrix corresponds to a $2^{n-1} \times 2^{n-1}$ matrix, and the second level 2×2 matrices correspond to one of the matrices in FIGS. 4A-4H. The pattern can be continued for any $2^{n+1}$ sensor array.

Figure 5A:
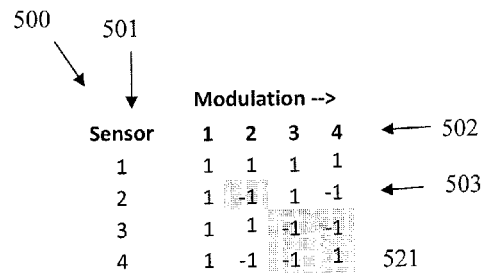

For example, for a four-sensor array, the 2×2 matrix of FIG. 4A could be used at every level to generate a multiplexing scheme, as illustrated in FIG. 5A. As can be seen therein, the FIG. 4A sensor array is repeated for every position of the first level 2×2 matrix, except the 2,2 position, where the whole matrix is reversed, as with the polarity of the second sensor at the second modulation in FIG. 4A.

Figure 5B:
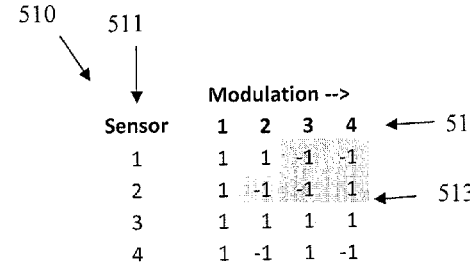
Figure 5C:
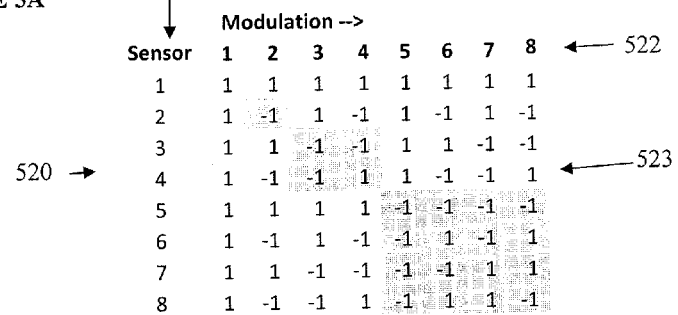
Figure 5D:
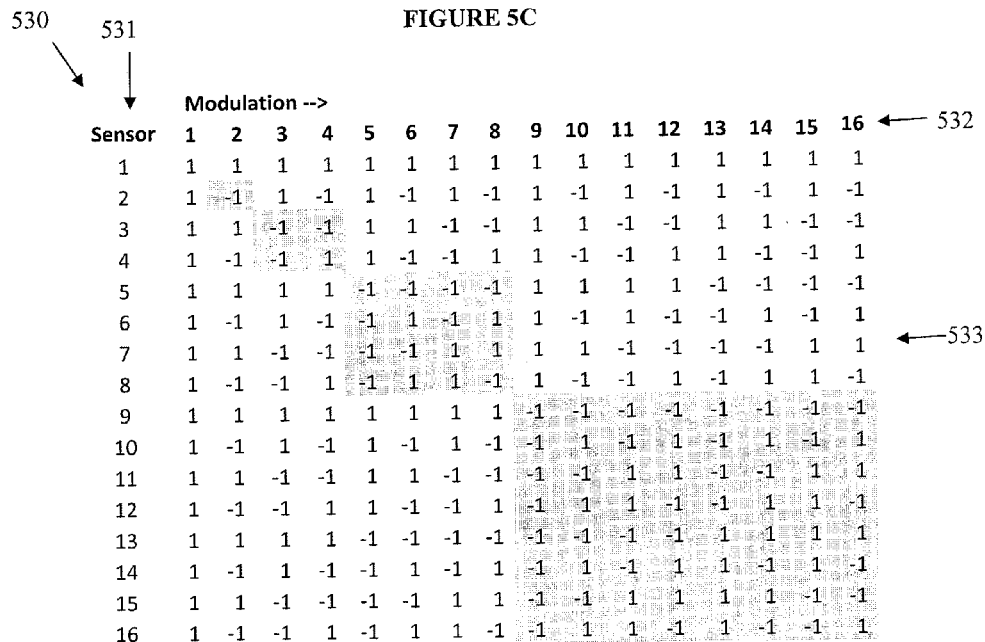

The multiplexing scheme of FIG. 4A can be used to generate a multiplexing scheme for an eight-sensor array by applying the four-sensor matrix of FIG. 5A to the 2×2 first level matrix of FIG. 4A, as illustrated in FIG. 5C. As can be seen therein, the FIG. 5A sensor array is repeated for every position of the first level 2×2 matrix, except the 2,2 position, where the whole matrix is reversed, like the polarity of the second sensor at the second modulation in FIG. 4A. The method may be repeated further to generate a 16 sensor array, as in FIG. 5D. One of skill in the art may recognize that the matrices described herein correspond to Hadamard matrices of order $2^n$, where n is any positive integer.

One of ordinary skill in the art will recognize that the FIG. 4A matrix need not be the basis for generating the multiplexing scheme—any of the 2×2 matrices of FIG. 4A-4H may be used. Further, any combination of the 2×2 matrices of FIGS. 4A-4H could be used within one multiplexing scheme, provided every 2×2 matrix at each level corresponds to one of the matrices in FIGS. 4A-4H. In a four-sensor array, for example, the 2×2 matrix of FIG. 4B could be used for the first-level matrix and the 2×2 matrix of FIG. 4A could be used to generate the second-level matrix, as is demonstrated in FIG. 5B.

Note that in any of the multiplexing schemes generated by the above method, the modulations can be interchanged without deviating from the present application. For instance, once the multiplexing scheme of FIG. 5C is created, modulation 5 and modulation 6, i.e., columns 5 and 6, could be exchanged to create another multiplexing scheme which can be demultiplexed to determine the electrical signals of the individual sensors.

An alternative method for generating a multiplexing scheme for a $2^n$-sensor array will now be presented. The alternative method includes transposing the sensor numbers to binary code and using the digits in the binary string to generate the multiplexing scheme. In one embodiment, a "Σ-Δ code" is used as a shorthand to represent the traditional binary digits "0" and "1," although any equivalent formulation could be used. For a $2^n$-sensor array, the sensor numbers are written in Σ-Δ code, requiring n binary bits. For each order, a modulation sequence is generated. If a bit at an order corresponds to Σ, then all modulations are positive in that order's sequence. If a bit corresponds to Δ, then the modulations for that sequence depend on the order: a first order Δ indicates an alternating polarity for adjacent modulations, a second order Δ indicates an alternating polarity for adjacent groups of two modulations, a third order Δ indicates an alternating polarity for adjacent groups of four ($=2^{3-1}$) modulations, and so on. The modulation of each sensor is then generated by multiplying each order's modulation sequence for the corresponding Σ-Δ code representation.

Exemplary sensor modulations generated by an Σ-Δ code in accordance with the present application will now be described for an eight-sensor array, where the sensors are numbered 0, 1, 2, 3, 4, 5, 6, and 7. Table 1 illustrates generation of the modulation sequences for sensor "3," represented in Σ-Δ code by ΣΔΔ ($=2^0+2^1+2^1$).

TABLE 1

| ΣΔΔ | | | | | | | | | |
|---|---|---|---|---|---|---|---|---|---|
| $1^{st}$ Order | - - Δ | 1 | −1 | 1 | −1 | 1 | −1 | 1 | −1 |
| $2^{nd}$ Order | - Δ - | 1 | 1 | −1 | −1 | 1 | 1 | −1 | −1 |
| $3^{rd}$ Order | Σ - - | 1 | 1 | 1 | 1 | 1 | 1 | 1 | 1 |
| Result | | 1 | −1 | −1 | 1 | 1 | −1 | −1 | 1 |

Table 2 illustrates generation of the modulation sequences for sensor "6," represented in Σ-Δ code by ΔΔΣ ($=2^1+2^1+2^0$).

TABLE 2

| ΔΔΣ | | | | | | | | | |
|---|---|---|---|---|---|---|---|---|---|
| $1^{st}$ Order | - - Σ | 1 | 1 | 1 | 1 | 1 | 1 | 1 | 1 |
| $2^{nd}$ Order | - Δ - | 1 | 1 | −1 | −1 | 1 | 1 | −1 | −1 |
| $3^{rd}$ Order | Δ - - | 1 | 1 | 1 | 1 | −1 | −1 | −1 | −1 |
| Result | | 1 | 1 | −1 | −1 | −1 | −1 | 1 | 1 |

Further, the exemplary $2^{n+1} \times 2^{n+1}$ matrices described herein can also be used to generate multiplexing schemes for an array with m sensors, wherein $2^n < m < 2^{n+1}$. To create a multiplexing scheme for an m-sensor array, only m modulations of a $2^{n+1}$ multiplexing scheme need be used.

FIG. 5E illustrates an exemplary multiplexing scheme 540 for a sensor array comprising six sensors, in accordance with the present application. As above, the first column 541 identifies each sensor, the first row 542 identifies the modulation number, and the polarity matrix 543 represents the multiplexing scheme, wherein the sign of the numeral 1 at each position represents the polarity of the associated sensor at that modulation. Because $2^2 < 6 < 2^3$, any eight-sensor multiplexing scheme in accordance with the present application could be used. As can be seen by comparing FIGS. 5C and 5E, the multiplexing scheme of FIG. 5E is generated from the eight-sensor multiplexing scheme of FIG. 5C.

A method for generating a multiplexing scheme for a $2^n$ column by $2^n$ row sensor array will now be discussed. First, two $2^2 \times 2^n$ matrices are selected, one matrix each for column modulation and row modulation. Each of these $2^2 \times 2^n$ matrices correlate to a $2^n$ multiplexing scheme generated using the method described above with respect to FIGS. 4 and 5. Then, these two matrices are overlaid to generate the multiplexing scheme for the entire sensor array, i.e., the row modulation matrix is entered in each position of the column modulation matrix and the sign of the row modulation matrix entries is reversed when the column matrix entry is "−1."

To illustrate this method, FIG. 5F is an exemplary multiplexing scheme 550 for a sensor array comprising 4 columns and 4 rows, in accordance with the present application. The first column 551 identifies the sensor, the first row 552 identifies the modulation number, and the polarity matrix 553 represents the multiplexing scheme, wherein the sign of the numeral 1 at each position represents the polarity of the associated sensor at that modulation. Multiplexing scheme 550 may be implemented with a modulation system incorporating XOR gates at each sensor, such as modulation system 300 described above with respect to FIG. 3.

Multiplexing scheme 550 was generated using the 4×4 matrices illustrated in FIGS. 5A and 5B for the row and column modulation modulation, respectively. However, any combination of 4×4 matrices could be used. As illustrated in FIG. 5F, the row modulation matrix, FIG. 5A, is repeated in each of the positions that correspond to a positive polarity ("1") in FIG. 5B, the column modulation matrix, and sign-reversed in all of the position that correspond to a negative polarity ("−1") in FIG. 5B. To highlight the use of FIG. 5B as the column modulation matrix, row modulation matrices of negative polarity have been shaded in FIG. 5F.

Further, the sensor array need not comprise a $2^n$ column by $2^n$ row sensor array. For an m column by m row sensor array, where $2^{n-1} < m < 2^n$, two $2^n$ matrixes are first selected similar to the method described above with respect to FIG. 5E. The resulting matrices are then overlaid to create the multiplexing scheme for the m column by m row sensor array.

It should be understood that the multiplexing schemes described here are provided for illustrative purposes only and the multiplexing scheme of the present invention may take any form that enables the multiplexed electrical signals to be demultiplexed to yield the electrical signals of each sensor.

Demultiplexers of the present application can implement algorithms that solve the linear equations described above. For example, one benefit of the multiplexing schemes above is that the signal of sensor i, where i is any number between 1 and N (the number of sensors), can be calculated by first adjusting the matrix so that all the values for that signal's row are positive and then adding together all columns of the adjusted matrix. The sum results in a total of N times sensor i's electrical signal and zero for all the other sensors, i.e., all the values for the other sensors' rows sum to zero. Accordingly, sensor i can be determined by dividing the resulting combined signal by N. In this way, this demultiplexing algorithm requires N computations for each of the N sensors and, thus, the computation order for this algorithm is $O(N^2)$.

In another preferred embodiment, a demultiplexing algorithm of computation order $O(N \log_2 N)$ is used by employing a $\Sigma$-$\Delta$ binary code similar to that described above with respect to Tables 1 and 2. This computation advantage is achieved by noting that many of the computations in the $O(N^2)$ embodiment described above are redundant. This redundancy can be removed, and consequently the computational speed improved, by performing the computations in steps, or orders, where each order utilizes the computations of the previous order. In this embodiment, the demultiplexer is essentially "undoing" the $\Sigma$-$\Delta$ code modulations described above with respect to Tables 1 and 2.

In this embodiment, there are $2^m$ $\Sigma$-$\Delta$ representations at the $m^{th}$-order (i.e., $1^{st}$ order={$\Sigma$ and $\Delta$}, $2^{nd}$ order={$\Sigma\Sigma$, $\Sigma\Delta$, $\Delta\Sigma$, and $\Delta\Delta$}, etc.). Each $\Sigma$-$\Delta$ representation includes $2^{n-m}$ components (where $N=2^n$), formed by adding and subtracting adjacent components of each $\Sigma$-$\Delta$ representation of the previous order. Specifically, the two $1^{st}$-order $\Sigma$-$\Delta$ representations ($\Sigma$ and $\Delta$) are first determined by adding and subtracting adjacent pairs of samples of each of the N modulations, where each of the two $1^{st}$-order $\Sigma$-$\Delta$ representations has $2^{n-1}$ components. Then, the four ($=2^2$) $2^{nd}$-order $\Sigma$-$\Delta$ representations ($\Sigma\Sigma$, $\Sigma\Delta$, $\Delta\Sigma$, and $\Delta\Delta$) are determined by adding and subtracting adjacent pairs of the components of each $1^{st}$-order $\Sigma$-$\Delta$ representation ($\Sigma$ and $\Delta$), where each of the four $2^{nd}$-order $\Sigma$-$\Delta$ representations has $2^{n-2}$ components. This process continues for n orders. Finally, to determine the signal of each sensor, the component ($2^{n-n}=1$ component) of each $n^{th}$-order $\Sigma$-$\Delta$ representation is divided by N.

In this way, the computation order for this demultiplexing algorithm is $O(N \log_2 N)$. This can be appreciated by first noting that there are $\log_2 N$ ($=n$) orders. Also, because there are $2^m$ $\Sigma$-$\Delta$ representations at each order and each $\Sigma$-$\Delta$ representation contains $2^{n-m}$ components at order m, a total of N ($=2^m \times 2^{n-m}$) computations are required to generate the $\Sigma$-$\Delta$ representations of each order. Accordingly, the computation order for the demultiplexing algorithm of this embodiment is $O(N \log_2 N)$.

Figure 6:
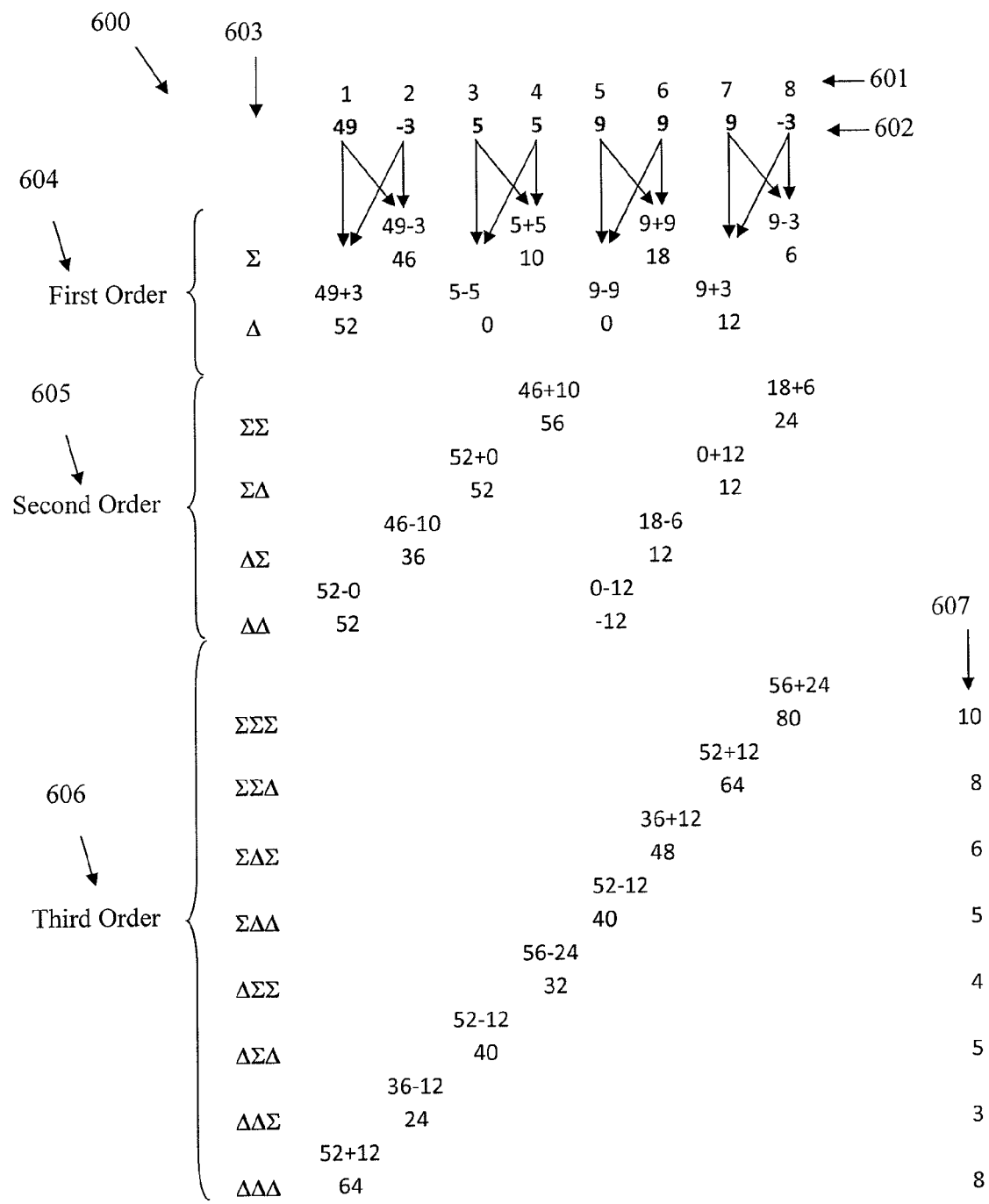
FIG. 6 is an exemplary demultiplexing algorithm 600 for an eight-sensor array in accordance with the present application.

To illustrate this method, FIG. 6 is an exemplary demultiplexing algorithm 600 for an eight-sensor array. Demultiplexing algorithm 600 includes eight modulations 601, multiplexed samples 602 for each modulation, and $\Sigma$-$\Delta$ code representations 603 for each of a $1^{st}$-order 604, $2^{nd}$-order 605, and $3^{rd}$-order 606. The input value of each sensor 607 is the result of performing demultiplexing algorithm 600.

Each $\Sigma$-$\Delta$ representation in demultiplexing algorithm 600 is calculated by either adding or subtracting adjacent pairs of components of each of the previous order's $\Sigma$-$\Delta$ representations. For example, the two $1^{st}$-order $\Sigma$-$\Delta$ representations 604 ($\Sigma$ and $\Delta$) are calculated by subtracting and adding pairs of the multiplexed samples. The four $2^{nd}$-order $\Sigma$-$\Delta$ representations 605 ($\Sigma\Sigma$, $\Sigma\Delta$, $\Delta\Sigma$, and $\Delta\Delta$) are then calculated by subtracting or adding adjacent pairs of components of the $1^{st}$-order $\Sigma$-$\Delta$ representations ($\Sigma$ and $\Delta$). The eight 3rd-order $\Sigma$-$\Delta$ representations 606 are calculated by subtracting or adding adjacent pairs of components of the $2^{nd}$-order $\Sigma$-$\Delta$ representations. Each of the resulting $3^{rd}$-order $\Sigma$-$\Delta$ representations must be divided by 8 (the number of sensors) to give each sensor's input value 607.

One of skill in the art will readily recognize that the above demultiplexing algorithms are similar to Fast Fourier Transforms and Divide-and-Conquer algorithms. However, the present application should not be understood to be limited to such algorithms and any method of demultiplexing the samples could be employed without deviating from the scope of the present application.

Figure 7:
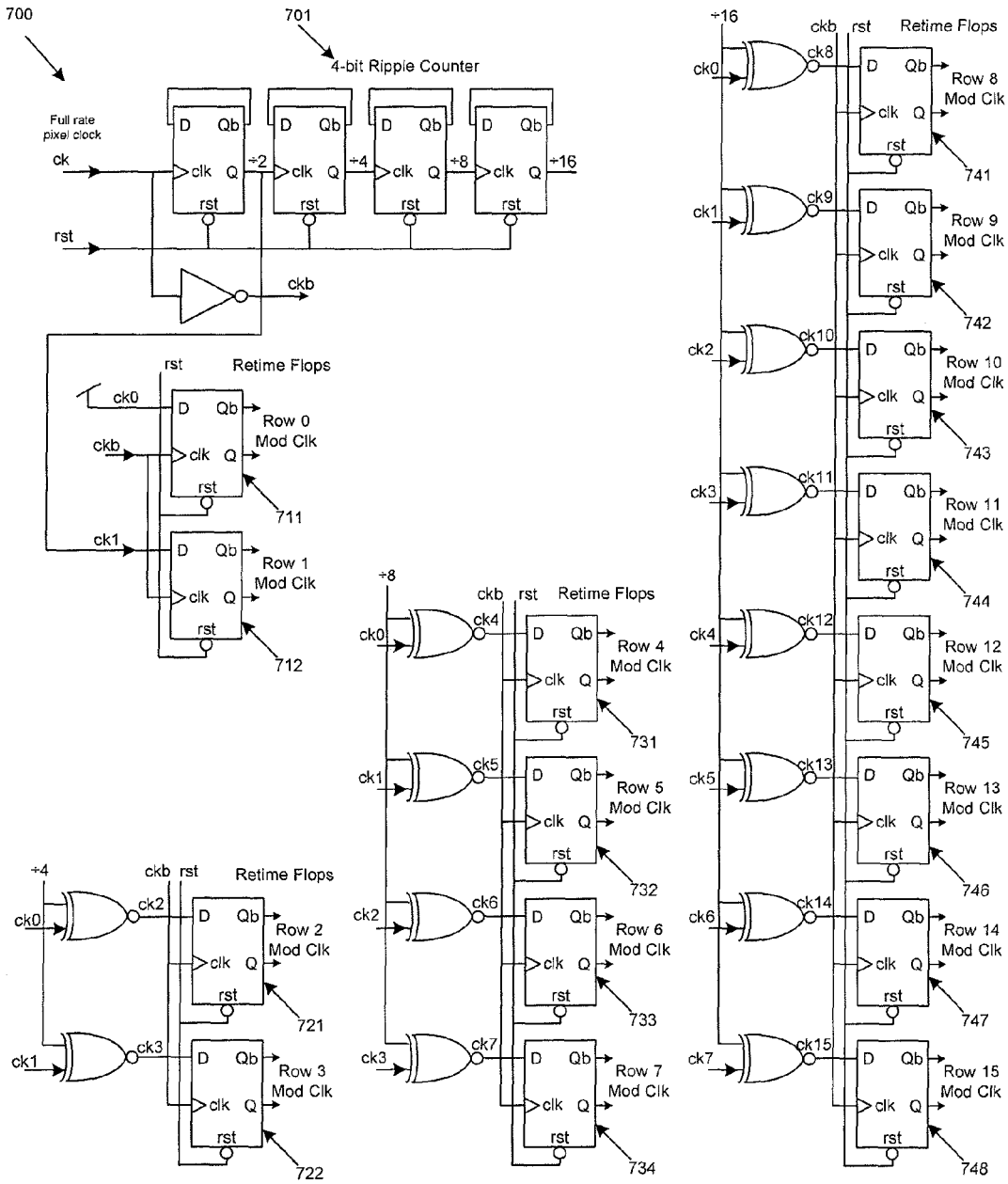
FIG. 7 illustrates logic 700 for implementing a multiplexing scheme, in accordance with the present application.

FIG. 7 illustrates exemplary logic 700 for implementing a multiplexing scheme, in accordance with the present application. Logic 700 includes ripple counter 701 and sixteen modulation clock retime flip flops 711, 712, 721, 722, 731, 732, 733, 734, 741, 742, 743, 744, 745, 747, 747, and 748. Both the ripple counter 701 and modulation clock retime flip flops may comprise multiplexing scheme generator 110, described above with respect to FIG. 1.

Modulation clock 711 is hardcoded to a logical high ("1"). Modulation clocks $2^{(n-1)}+1$ to $2^n$ are generated using modulation clocks 1 to $2^{(n-1)}$ gated with the nth bit of the ripple counter in an XNOR configuration. In this manner, each bit in the ripple counter can modulate two outputs, in a manner similar to the sensor modulation schemes presented above with respect to FIG. 4A-4H. Accordingly, for multiplexing schemes with $2^n$ modulation clocks, an n-bit ripple counter is required. The modulation of each bit in the ripple counter builds on the modulation of the previous bit in the ripple counter, to generate a modulation scheme in a manner similar to that described above with respect to FIGS. 5A-5F. With respect to logic 700, the first bit in ripple counter 701 is used to modulate modulation clocks 711 and 712, the second bit in ripple counter 701 XNORed with the outputs of 711 and 712 generates modulation clocks 721 and 722, respectively, the third bit in ripple counter 701 XNORed with the outputs of 711, 712, 721, and 722 generates modulation clocks 731, 732, 733, and 734, respectively, and the fourth bit in ripple counter 701 XNORed with the outputs of 711, 712, 721, 722, 731, 732, 733, and 734 generates modulation clocks 741, 742, 743, 744, 745, 747, 747, and 748, respectively. In this way, an n-bit ripple counter can generate $2^n$ modulation clocks, i.e., generate the multiplexing scheme that is implemented by a modulation system with $2^n$ modulation clocks.

Logic 700 is offered by way of example and it will be readily appreciated by one of ordinary skill in the art that any number of equivalent arrangements could be used without deviating from the spirit of the invention.

Figure 8:
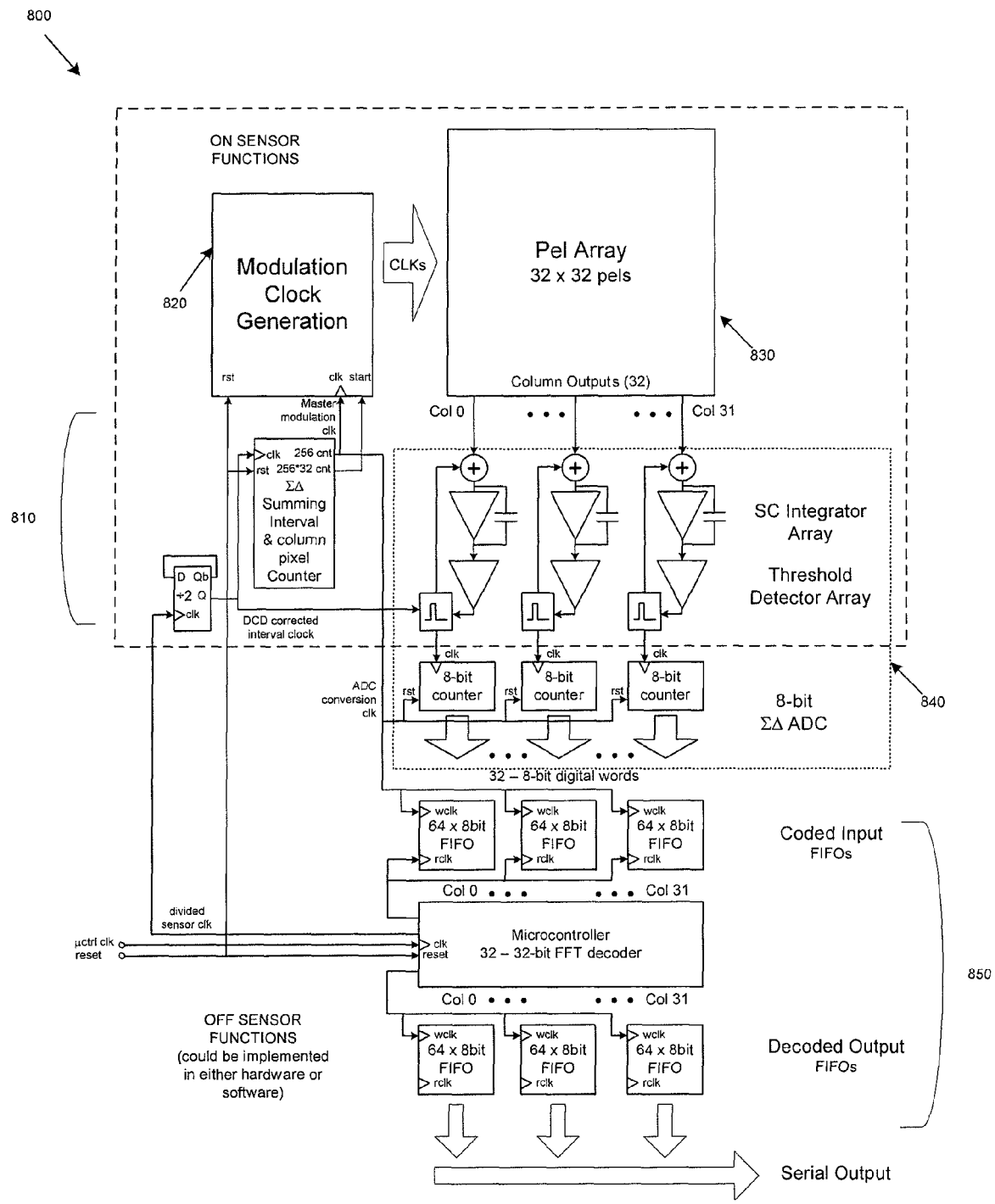
FIG. 8 illustrates the circuitry of frequency multiplexed sensor array 800 in accordance with an exemplary embodiment of the present application.

FIG. 8 illustrates the circuitry of frequency multiplexed sensor array 800 in accordance with an exemplary embodiment of the present application. Frequency multiplexed sensor array 800 comprises a multiplexing scheme generator 810, a modulation system 820, a sensor array 830, a readout device 840, and a demultiplexer 850. Frequency multiplexed sensor array 800 may comprise frequency multiplexed sensor array 100 described above with respect to FIG. 1.

Multiplexing scheme generator 810 may comprise ripple counter 701 of logic 700 described above with respect to FIG. 7. Modulation system 820 may comprise modulation system 120 described above with respect to FIG. 1. Sensor array 830 comprises a 32×32 sensor array.

Readout device 840 comprises several analog to digital converters for providing a digital readout of the multiplexed signal of the sensors in the sensor array 830. A first-order, sigma-delta analog to digital converter is displayed as readout device 840; however, any order sigma-delta architecture or any other analog to digital converter architecture could be used. In some embodiments, a sigma-delta architecture may provide a simple analog front end that can be integrated onto the sensor and provide the number of bits that can be extracted through over sampling. In these embodiments, the sigma-delta architecture provides the dynamic range necessary to extract a weak signal from the sensors. Note that the resolution of the analog to digital converter may vary depending on the application. Accordingly, the 8-bit analog digital converter in readout device 840 is offered by way of example only and some applications may require larger or smaller resolution, including, for example, 20-24 bits. Readout device 840 may comprise readout device 130 described above with respect to FIG. 1.

Demultiplexer 850 comprises a microcontroller and associated memory. The associated memory may comprise First-in First-out (FIFO) memory blocks. Demultiplexer 850 may comprise demultiplexer 150 described above with respect to FIG. 1. The FIFOs store data until the microcontroller is ready to process it, thereby allowing the microcontroller and readout device to operate at different rates. The microcontroller employs an algorithm to demodulate the sample signals based on the modulation scheme. Demultiplexer 850 may comprise demultiplexing algorithm 600 described above with respect to FIG. 6.

Frequency multiplexed sensor array 800 is offered by way of example and should not be understood as a limiting embodiment of the present invention. It should be noted that any algorithm could be employed in the microcontroller discussed above. Further, a microcontroller need not be employed and alternative means for demultiplexing the samples are contemplated, such as, for example, a field-programmable gate array or other hardware devices operable to implement logical function.

Figure 9:
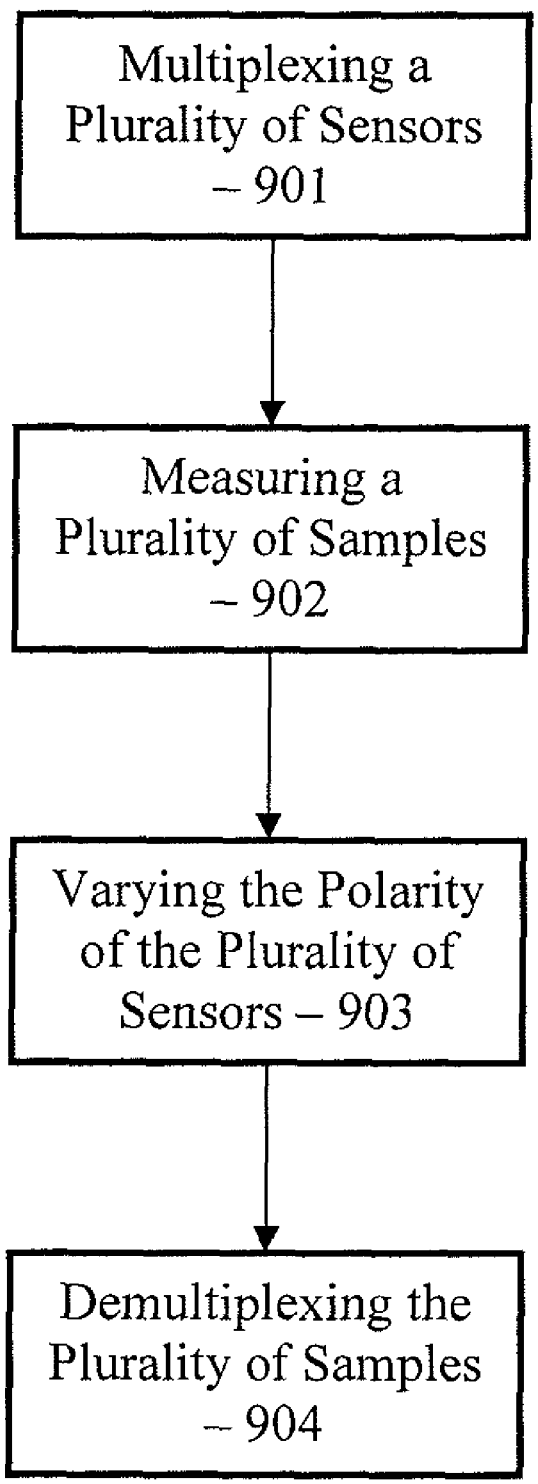
FIG. 9 is a block diagram of a process 900 of determining the electrical signal of each of a plurality of electrically connected sensors in a sensor array, according to an exemplary embodiment of the present application.

FIG. 9 is a block diagram of a process 900 of determining the electrical signal of each of a plurality of electrically connected sensors in a sensor array, according to an exemplary embodiment of the present application. It should be appreciated that process 900 may include any number of additional or alternative tasks. The tasks shown in FIG. 9 need not be performed in the illustrated order, and process 900 may be incorporated into a more comprehensive procedure or process having additional functionality not described in detail herein. Process 900 may be implemented using the embodiments illustrated in FIGS. 1-8 and, for illustrative purposes, the following description of process 900 may refer to elements mentioned above in connection with FIGS. 1-8.

As shown in FIG. 9, process 900 includes multiplexing 901 a plurality of sensors of the sensor array (for example, sensor array 130 described with respect to FIG. 1), wherein multiplexing a plurality of sensors comprises selectively reversing the polarity of each sensor. Step 901 may also include providing a multiplexing scheme generator for determining which sensors are polarity-reversed for each modulation. Step 901 may also include providing a modulation system for implementing a multiplexing scheme.

As also shown in FIG. 9, process 900 includes measuring 902 a plurality of samples of the plurality of multiplexed sensors (using readout device 140 described with respect to FIG. 1, for example). In accordance with one embodiment of the present application, to demultiplex each of the sensor's electrical signal from the multiplexed signal, the number of samples must be at least the number of sensors in the sensor array.

Process 900 also includes varying 903 the polarity of the plurality of sensors for each of the plurality of samples so that the plurality of samples can be demultiplexed to determine the electrical signal of each sensor. In one embodiment, varying 903 the polarity of the plurality of sensors is controlled by a multiplexing scheme (not shown) and implemented by a modulation system (not shown). Finally, process 900 includes demultiplexing 904 the plurality of samples (using demultiplexer 150 described with respect to FIG. 1, for example).

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A sensor array, comprising:
 a plurality of sensors electrically connected in series or in parallel, each of the plurality of sensors operable to generate an individual electrical signal;
 a multiplexing scheme generator operable to generate a multiplexing scheme;
 a modulation system connected to the multiplexing scheme generator and operable to selectively reverse the polarity of each of the plurality of sensors for each of a plurality of samples based on the multiplexing scheme;
 a readout device operable to sequentially read a plurality of output signals of the plurality of electrically connected sensors, wherein the number of samples read is greater than or equal to the number of sensors and wherein one or more electrical signals of the plurality of sensors are readout as one electrical signal; and a demultiplexer operable to receive the output electrical signals and to determine the individual electrical signals of each of the plurality of sensors based on the multiplexing scheme.

2. The sensor array of claim 1, wherein the sensor array further comprises no more than $2^{n+1}$ sensors, wherein n is any positive integer, and wherein the multiplexing scheme generator generates a multiplexing scheme based on at least one two-sensor, two-modulation multiplexing scheme at each level, wherein each two-sensor, two-modulation multiplexing scheme comprises a different polarity for one sensor for the two modulations and the same polarity of the other sensor for the two modulations.

3. The sensor array of claim 2, wherein
the sensor array further comprises m sensors, where $2^n < m < 2^{n+1}$, and
the multiplexing scheme is further based on a $2^{n+1}$-sensor multiplexing scheme.

4. The sensor array of claim 1, wherein the demultiplexer is further operable to implement a Fast Fourier Transform.

5. The sensor array of claim 1, wherein the plurality of sensors further comprises a plurality of thermopiles.

6. The sensor array of claim 1, wherein
the sensor array further comprises no more than $2^{n+1}$ sensors, wherein n is any positive integer, and
the multiplexing scheme generator generates a multiplexing scheme based on a method comprising the steps of:
representing each sensor in a n-bit binary code comprising n orders;
for each order of the n-bit binary code of each sensor, generating a modulation sequence based on the bit at that order; and
for each sensor, multiplying together the modulation sequence of each order of the n-bit binary code of that sensor.

7. The sensor array of claim 6, wherein the demultiplexer is further operable to determine the electrical signal of each sensor by performing $(n+1) \times \log_2(n+1)$ computations comprising either addition or subtraction and dividing the result by $(n+1)$.

8. The sensor array of claim 6, wherein
the sensor array further comprises m sensors, where $2^n < m < 2^{n+1}$, and
the multiplexing scheme is further based on a $2^{n+1}$-sensor multiplexing scheme.

9. The sensor array of claim 1, wherein the plurality of sensors are arranged in a plurality of rows and a plurality of columns and wherein the multiplexing system further comprises:
a row clock for each of the plurality of rows, wherein a row clock is operable to reverse the polarity of the sensors in a row;
a column clock for each of the plurality of columns, wherein a column clock is operable to reverse the polarity of the sensors in a column; and
an XOR gate at each of the plurality of sensors operable to reverse the polarity of the sensor when only one of the associated row and column clocks reverses polarity.

10. The sensor array of claim 9, wherein the sensor array further comprises $2^{2n}$ sensors, wherein n is any positive integer, and wherein the multiplexing scheme generator generates a multiplexing scheme by overlaying a row clock multiplexing scheme in a column clock multiplexing scheme, wherein each of the row clock multiplexing scheme and the column clock multiplexing scheme is based on at least one two-sensor, two-modulation multiplexing scheme at each level, wherein each two-sensor, two-modulation multiplexing scheme comprises a different polarity for one sensor for the two modulations and the same polarity for the other sensor for the two modulations.

11. The sensor array of claim 9, wherein the demultiplexer is further operable to implement a Fast Fourier Transform.

12. A method of determining the individual electrical signal of each of a plurality of sensors in a sensor array, the plurality of sensors electrically connected in series or in parallel, the method comprising:
generating a multiplexing scheme;
multiplexing the plurality of sensors, wherein multiplexing a plurality of sensors comprises selectively reversing the polarity of each sensor for each of a plurality of samples based on the multiplexing scheme;
measuring the plurality of samples of the plurality of multiplexed sensors, wherein the number of samples is at least the number of sensors and wherein one or more electrical signals of the plurality of sensors are readout as one electrical signal; and
demultiplexing the plurality of samples, wherein demultiplexing a plurality of samples comprises receiving the output electrical signals and determining the individual electrical signals of each of the plurality of signals based on the multiplexing scheme.

13. The method of claim 12, wherein the sensor array further comprises $2^{n+1}$ sensors, wherein n is any positive integer, and wherein the step of multiplexing the plurality of sensors further comprises generating a multiplexing scheme based on at least one two-sensor, two-modulation multiplexing scheme at each level, wherein each two-sensor, two-modulation multiplexing scheme comprises a different polarity for one sensor for the two modulations and the same polarity for the other sensor for the two modulations.

14. The method of claim 12, wherein the step of demultiplexing the plurality of samples further comprises implementing a Fast Fourier Transform.

15. The method of claim 12, wherein the plurality of sensors further comprises a plurality of thermopiles.

16. The method of claim 12, wherein the plurality of sensors are arranged in a plurality of rows and a plurality of columns and wherein the step of multiplexing the plurality of sensors further comprises:
providing a row clock for each of the plurality of rows, wherein a row clock is operable to reverse the polarity of the sensors in a row;
providing a column clock for each of the plurality of columns, wherein a column clock is operable to reverse the polarity of the sensors in a column; and
providing an XOR gate at each of the plurality of sensors operable to reverse the polarity of the sensor when only one of the associated row and column clocks reverses polarity.

17. The method of claim 16, wherein the sensor array further comprises $2^{n+1}$ sensors, wherein n is any positive integer, and wherein the multiplexing scheme generator generates a multiplexing scheme based on at least one two-sensor, two-modulation multiplexing scheme at each level, wherein each two-sensor, two-modulation multiplexing scheme comprises a different polarity for one sensor for the two modulations and the same polarity for the other sensor for the two modulations.

18. The method of claim 17, wherein the step of demultiplexing the plurality of samples further comprises implementing a Fast Fourier Transform to the multiplexing scheme and the plurality of samples.

* * * * *